US010503600B2

United States Patent
Hsu et al.

(10) Patent No.: US 10,503,600 B2
(45) Date of Patent: Dec. 10, 2019

(54) FLASH MEMORY DEVICES AND ERROR-HANDLING METHODS THEREOF

(71) Applicant: Silicon Motion, Inc., Jhubei (TW)

(72) Inventors: Che-Wei Hsu, Taichung (TW); Ming-Chang Hsieh, Taoyuan (TW)

(73) Assignee: Silicon Motion, Inc., Jhubei (TW)

( * ) Notice: Subject to any disclaimer, the term of this patent is extended or adjusted under 35 U.S.C. 154(b) by 168 days.

(21) Appl. No.: 15/922,668

(22) Filed: Mar. 15, 2018

(65) Prior Publication Data

US 2019/0042366 A1 Feb. 7, 2019

(30) Foreign Application Priority Data

Aug. 7, 2017 (TW) .............................. 106126528 A

(51) Int. Cl.

| G06F 11/00 | (2006.01) |
|---|---|
| G06F 11/14 | (2006.01) |
| G06F 3/06 | (2006.01) |
| G06F 12/02 | (2006.01) |

(52) U.S. Cl.
CPC ........ *G06F 11/1402* (2013.01); *G06F 3/0619* (2013.01); *G06F 3/0659* (2013.01); *G06F 3/0679* (2013.01); *G06F 3/0688* (2013.01); *G06F 11/141* (2013.01); *G06F 12/0246* (2013.01); *G06F 2212/7201* (2013.01)

(58) Field of Classification Search
CPC .............. G06F 11/1402; G06F 3/0679; G06F 12/0246; G06F 3/0619; G06F 11/141; G06F 3/0659; G06F 3/0688; G06F 2212/7201; G06F 11/1068; G11C 2029/0411; G11C 29/42; G11C 29/04
See application file for complete search history.

(56) References Cited

U.S. PATENT DOCUMENTS

| 2008/0082788 | A1 | 4/2008 | Veidenbaum et al. | |
|---|---|---|---|---|
| 2011/0055839 | A1* | 3/2011 | Alexander | G06F 9/5066 718/102 |
| 2011/0258638 | A1* | 10/2011 | Davies | G06F 9/546 719/314 |
| 2013/0044118 | A1* | 2/2013 | Rajendran | G06T 1/20 345/506 |
| 2017/0177276 | A1* | 6/2017 | Delaney | G06F 3/0656 |

FOREIGN PATENT DOCUMENTS

| CN | 101533370 A | 9/2009 |
|---|---|---|
| TW | 201618118 A | 5/2016 |
| TW | 201638965 A | 11/2016 |

* cited by examiner

Primary Examiner — Jason B Bryan
(74) Attorney, Agent, or Firm — Wang Law Firm, Inc.

(57) ABSTRACT

A memory device receiving a host instruction generated by a host includes a flash memory array and a controller. The controller translates the host instruction into operation instructions, queues the operation instructions in a major command queue, and performs an operation on the flash memory array according to the operation instructions. When an error occurs during execution of the operation commands, the controller performs an error-handling process, queues operation commands related to the error-handling process in an auxiliary command queue, sequentially executes the operation commands in the auxiliary command queue, and stops executing the major command queue.

10 Claims, 4 Drawing Sheets

FLASH MEMORY DEVICES AND ERROR-HANDLING METHODS THEREOF

CROSS REFERENCE TO RELATED APPLICATIONS

This Application claims priority of Taiwan Patent Application No. 106126528, filed on Aug. 7, 2017, the entirety of which is incorporated by reference herein.

BACKGROUND OF THE INVENTION

Field of the Invention

The disclosure relates generally to flash memory devices and control methods thereof.

Description of the Related Art

When a flash memory is operated during read, erase, and write operations, an error may occur. For example, an error correction code (ECC) error may occur when the flash memory is operated during a read operation. An erase error may occur when the flash memory is operated during an erase operation. A write error may occur when the flash memory is operated during a write operation.

When an error occurs, the commands, which are operating or haven't operated yet, are usually interrupted or cancelled. After the error has been corrected, the interrupted or cancelled commands would be filled back, which leads to a higher error rate when executing commands. Therefore, the cleanliness and stability of executing commands should be improved.

BRIEF SUMMARY OF THE INVENTION

In an embodiment, a memory device receiving a host instruction generated by a host comprises a flash memory array and a controller. The controller translates the host instruction into a plurality of operation commands, queues the operation commands in a major command queue, and performs an operation on the flash memory array according to the operation commands. When an error occurs during execution of the operation commands, the controller performs an error-handling process. The controller queues a plurality of operation commands related to the error-handling process in an auxiliary command queue, sequentially executes the operation commands in the auxiliary command queue, and stops executing the major command queue.

According to an embodiment of the invention, when the operation is a write operation, the error is a write fail. When the write fail occurs during the write operation, the controller performs the write operation again according to the operation commands in the auxiliary command queue.

According to an embodiment of the invention, when the operation is an erase operation, the error is an erase fail. When the erase fail occurs during the erase operation, the controller performs the erase operation again according to the operation command in the auxiliary command queue.

According to an embodiment of the invention, when the operation is a read operation, the error is an ECC fail. When the ECC fail occurs during the read operation, the controller performs the read operation again according to the operation commands in the auxiliary command queue.

According to an embodiment of the invention, when the controller finishes the operation commands in the auxiliary command queue, the controller continues to execute the operation commands in the major command queue.

In an embodiment, an error-handling method adopted in a flash memory array comprises: receiving a host instruction generated by a host; translating the host instruction into a plurality of operation instructions; queuing the operation commands in a major command queue; performing an operation on the flash memory array according to the operation commands; determining whether an error occurs; when the error occurs, performing an error-handling process and queuing a plurality of operation commands related to the error-handling process in an auxiliary command queue; and sequentially executing the operation commands in the auxiliary command queue and stopping the execution of the major command queue.

According to an embodiment of the invention, when the operation is a write operation, the error is a write fail. When the write fail occurs during the write operation, the write operation is performed again according to the operation commands in the auxiliary command queue.

According to an embodiment of the invention, when the operation is an erase operation, the error is an erase fail. When the erase fail occurs during the erase operation, the erase operation is performed again according to the operation command in the auxiliary command queue.

According to an embodiment of the invention, when the operation is a read operation, the error is an ECC fail. When the ECC fail occurs during the read operation, the read operation is performed again according to the operation commands in the auxiliary command queue.

According to an embodiment of the invention, the error-handling method further comprises: when the operation commands in the auxiliary command queue are finished, continuing to execute the operation commands in the major queue.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
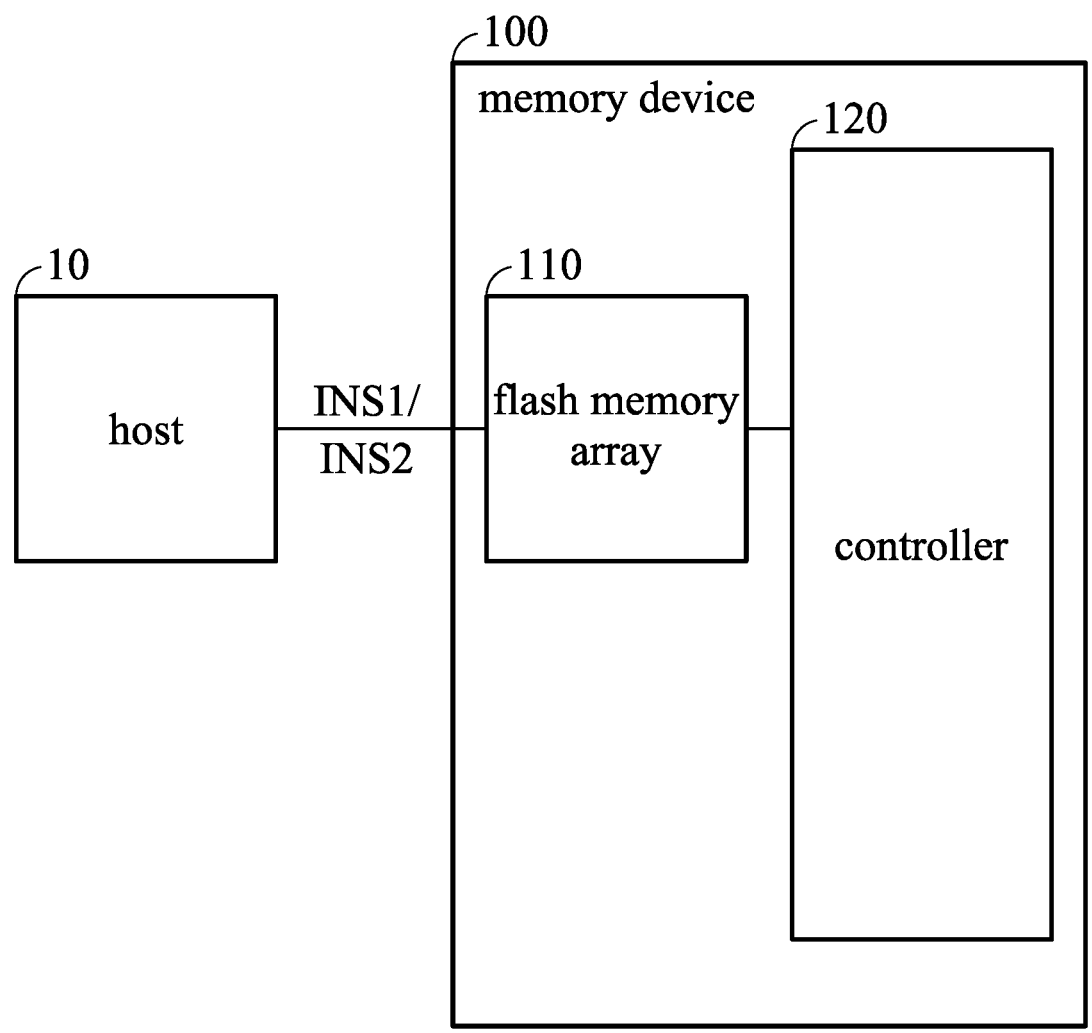
FIG. 1 is a block diagram of a memory device in accordance with an embodiment of the invention.

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It should be understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

FIG. 1 is a block diagram of a memory device in accordance with an embodiment of the invention. As shown in FIG. 1, the memory device 100 includes a flash memory array 110 and a controller 120, in which the memory device 100 sequentially receives a first host instruction INS1, a second host instruction INS2, a third host instruction INS3, . . . which are sequentially transmitted by the host 10. The host instruction INS may be an administration-type host instruction, such as an identify instruction or a Get-Log-Page instruction, or an Input/Output-type host instruction, such as a Data-Read instruction or a Flush instruction.

Figure 2:
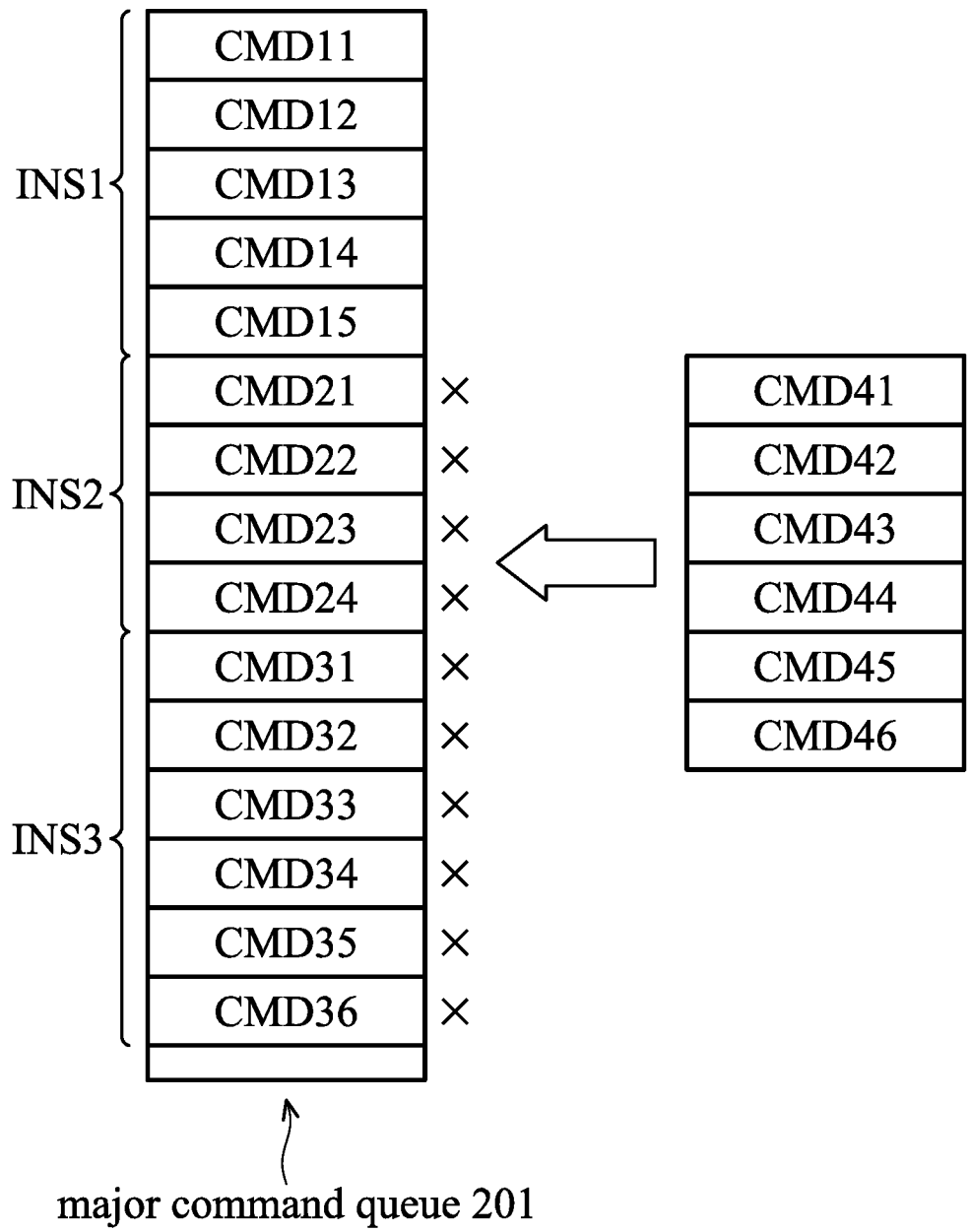
FIG. 2 is a schematic diagram of command queues in accordance with an embodiment of the invention.

The controller 120 further translates a host instruction INS into the operation commands CMD of the flash memory array 110 and stores the operation commands CMD in the major command queue 201. As shown in FIG. 2, the controller 120 executes the operation commands CMD stored in the major 201 to operate the flash memory array 110. The host instruction INS may be translated into several operation commands CMD, such as the first host instruction INS1 is translated into the operation commands CMD11~CMD15, the second host instruction INS2 is translated into the operation commands CMD21~CMD24, the third host instruction INS3 is translated into the operation commands CMD31~CMD36. In addition, the amount of operation commands translated from the host instruction INS may not be the same. In addition, the host instruction INS may be preferably executed First-In-and-First-Out, may be executed in the order of priority, and may be executed in turn of the type of the host instruction INS, such as the Administration-type host instruction is executed once and the Input/Output-type host instruction is executed twice. It is not intended to be limited thereto.

The first host instruction INS1 is a Data-Read instruction for illustration. The operation commands CMD11~CMD15 may be a pre-operation command, a page-read command, a status-polling command, or a data-output command, and so on. After the operation commands CMD11~CMD15 are successfully executed to get the execution results, the following operation commands CMD queued in the major command queue 201 are continued to be executed.

When the controller 110 does not finish one of the operation commands CMD corresponding to the first host instruction INS1 (such as when the flash memory array 110 indicates that the operation has failed, the target data may not pass the examination of ECC), the controller 110 activates an error-handling process for handling errors in the operation commands to cancel the operation commands CMD in the major command queue 201 which are not executed and include the operation commands CMD21~CMD24 and the operation commands CMD31~CMD36. Then, a set of operation commands CMD for handling the error of the operation commands is incorporated into the major command queue 201 (i.e., the operation instructions CMD41~CMD46 in FIG. 2) to handle the error. For example, when data reading fails, the error-handling process is to perform a re-read operation. The operation commands CMD41~CMD46 may be a parameter-transferring command, a pre-operation command, a page-read command, a status-polling command, or a data-read command, and so on. When the error has been handled or the error-handling process has been performed, the controller 110 further incorporates the cancelled operation commands CMD into the major command queue 201.

As stated above, when an operation command CMD is not able to be successfully executed or the execution result is a failure, the error-handling process may cancel some operation commands from the major command queue 201 or may incorporate some operation commands into the major command queue 201, which leads to an increasing complexity of managing the operation commands CMD in the major command queue 201.

Figure 3:
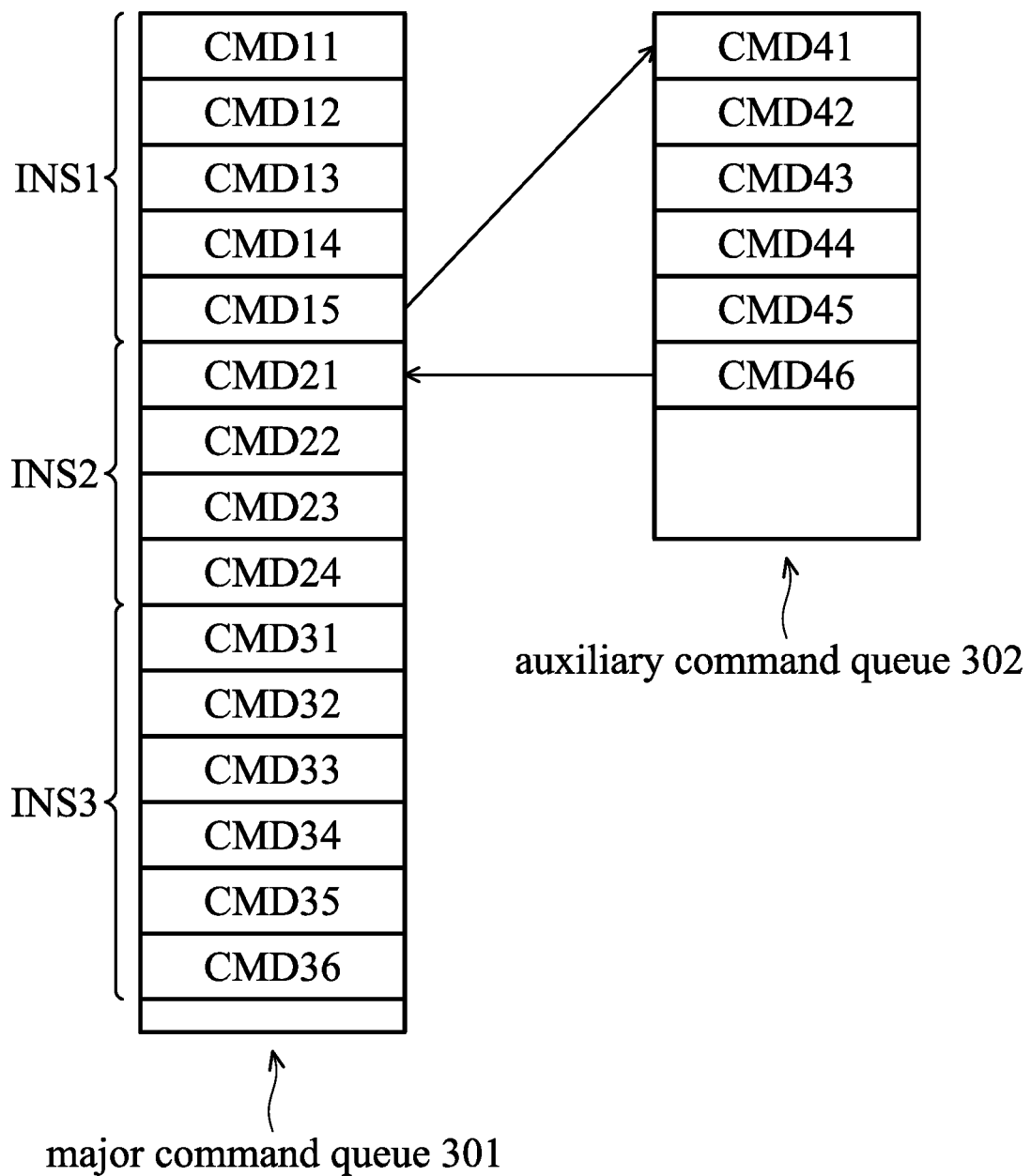
FIG. 3 is a schematic diagram of command queues in accordance with another embodiment of the invention.

The error-handling process provided in the invention utilizes double command queues to speed up the execution of the operation commands CMD and to lower the complexity of managing the operation commands CMD. As shown in FIG. 3, in addition to the major command queue 301, there is an auxiliary command queue 302. The auxiliary command queue 302 is configured to store the operation commands required for the error-handling process, such as the operation commands CMD41~CMD46. Therefore, the operation commands CMD queued in the major command queue 301 are never cancelled or moved due to the failure of the execution results. When the execution result is a failure, the error-handling process would record, in the major command queue 301, the operation command or commands CMD currently being executed, such as operation command CMD15, and any operation commands CMD which are waiting, such as operation command CMD21. A set of operation commands CMD for handling the error may be incorporated into the auxiliary command queue 302, and the operation commands CMD in the auxiliary command queue 302, such as the operation commands CMD41~CMD46, are sequentially executed. When the error-handling process has been successfully performed, the operation commands CMD in the major command queue 301 which are waiting are directly executed. In addition to recording the operation commands CMD in the major command queue 301, the major command queue 301 and the auxiliary command queue 302 may also store a plurality of identities pointing to the next executed operation command(s) CMD, such as operation command CMD41 in the auxiliary command queue 302 or operation command CMD21 in the major command queue 301.

Figure 4:
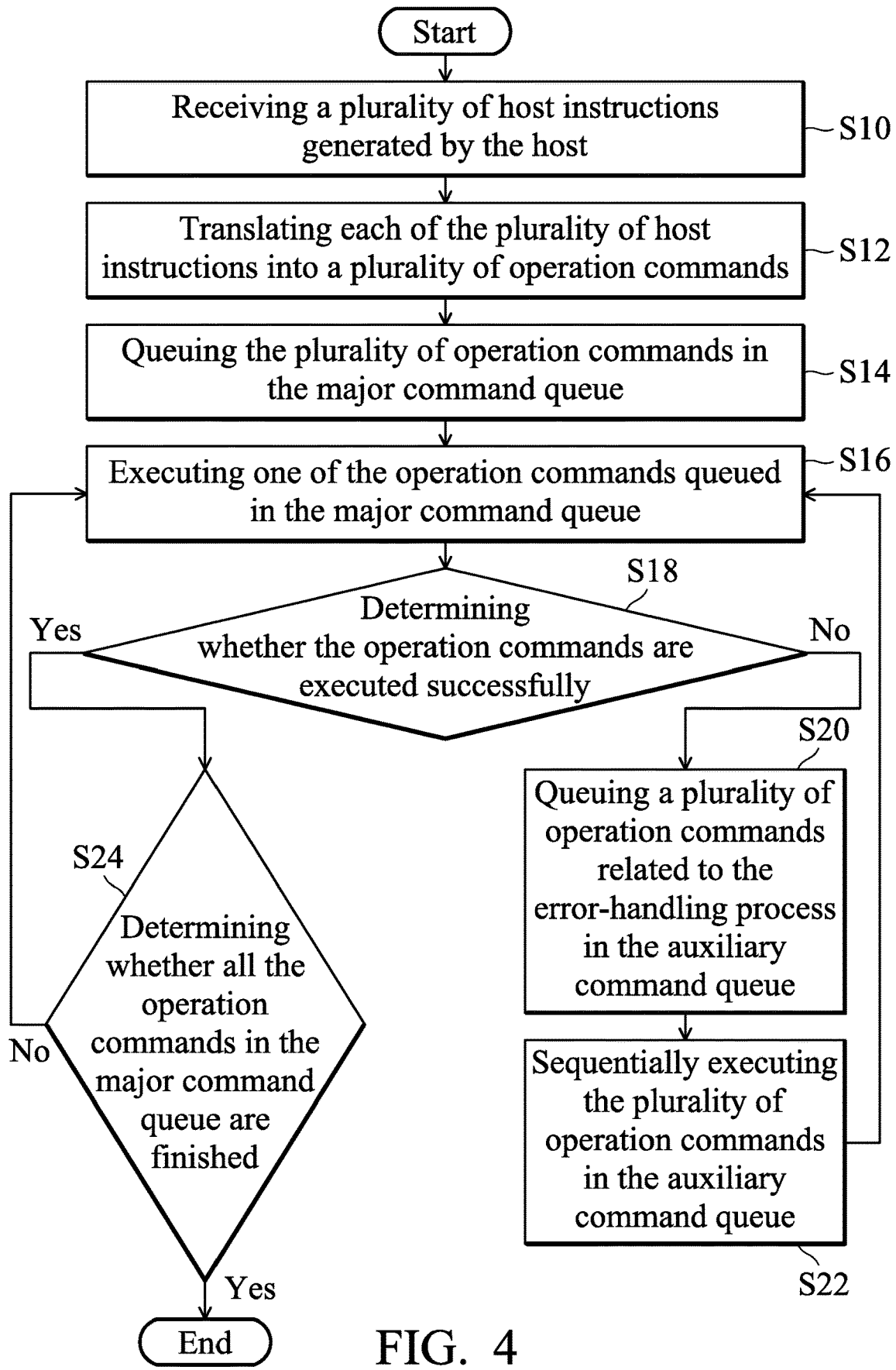
FIG. 4 is a flow chart of an error-handling method for handling errors of operation commands in accordance with an embodiment of the invention.

FIG. 4 is a flow chart of an error-handling method for handling an error of operation commands in accordance with an embodiment of the invention. The following description of FIG. 4 will be accompanied by FIG. 1 and FIG. 3 for a more detailed explanation.

First, a plurality of host instructions generated by the host are received (Step S10). The controller 110 receives the first host instruction INS1, the second host instruction INS2, and the third host instruction INS3 generated by the host 10.

Each of the plurality of host instructions is translated into a plurality of operation commands (Step S12). The controller 110 respectively translates the first host instruction INS1, the second host instruction INS2, and the third host instruction INS3 into operation commands CMD11~CMD15, operation commands CMD21~CMD24, and operation commands CMD31~CMD36.

The plurality of operation commands are queued in the major command queue 301 (Step S14). The controller 110 sequentially queues operation commands CMD11~CMD15, operation commands CMD21~CMD24, and operation commands CMD31~CMD36 in the major command queue 301.

One of the operation commands queued in the major command queue 301 is executed. The controller 110 sequentially executes the operation commands CMD11~CMD15.

Whether the operation commands are being executed successfully is determined (Step S18). When the controller 110 sequentially executes operation commands CMD11~CMD14 and operation commands CMD11~CMD14, Step S24 is performed. However, operation command CMD15 was not successfully executed, so Step S20 is performed.

A plurality of operation commands related to the error-handling process are queued in the auxiliary command queue 302 (Step S20). According to an embodiment of the invention, since the operation command CMD15 is related to the first host instruction INS1 which is a Data-Read instruction, the error-handling process of the Data-Read instruction is to re-read the data. Therefore, the controller 110 queues operation commands CMD41~CMD46 in the auxiliary command queue 302. The controller 110 preferably records the relationship between operation command CMD15 and operation command CMD41 and the relationship between operation command CMD21 and operation command CMD46, or the controller 110 points the index of operation command CMD15 to operation command CMD41 and points the index of operation command CMD46 to operation command CMD21.

The plurality of operation commands in the auxiliary command queue 302 are sequentially executed (Step S22). The controller 110 sequentially executes the operation commands CMD41~CMD46 to handle the error of the operation command CMD15 or the first host instruction INS1 and then goes back to Step S16.

Whether all of the operation commands in the major command queue 301 are finished is determined (Step S24). Since the controller 110 has only executed operation commands CMD11~CMD15 but operation commands CMD21~CMD24 and operation commands CMD31~CMD36 have not been executed, Step S16 is performed again, executing operation commands CMD21~CMD24. When all of the operation commands in the major command queue 301 are finished, the error-handling method provided in the invention is then terminated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A memory device receiving a host instruction generated by a host, comprising:
   a flash memory array; and
   a controller, translating the host instruction into a plurality of operation commands, queuing the operation commands in a major command queue, and performing an operation on the flash memory array according to the operation commands, wherein when an error occurs during execution of the operation commands, the controller performs an error-handling process, wherein the controller queues a plurality of operation commands related to the error-handling process in an auxiliary command queue, sequentially executes the operation commands in the auxiliary command queue, and stops executing the major command queue.

2. The memory device of claim 1, wherein when the operation is a write operation, the error is a write fail, and when the write fail occurs during the write operation, the controller performs the write operation again according to the operation commands in the auxiliary command queue.

3. The memory device of claim 1, wherein when the operation is an erase operation, the error is an erase fail, and when the erase fail occurs during the erase operation, the controller performs the erase operation again according to the operation command in the auxiliary command queue.

4. The memory device of claim 1, wherein when the operation is a read operation, the error is an error correction code (ECC) fail, and when an ECC fail occurs during the read operation, the controller performs the read operation again according to the operation commands in the auxiliary command queue.

5. The memory device of claim 1, wherein when the controller finishes the operation commands in the auxiliary command queue, the controller continues to execute the operation commands in the major command queue.

6. An error-handling method adopted in a flash memory array, comprising:
   receiving a host instruction generated by a host;
   translating the host instruction into a plurality of operation instructions;
   queuing the operation commands in a major command queue;
   performing an operation on the flash memory array according to the operation commands;
   determining whether an error occurs;
   when the error occurs, performing an error-handling process and queuing a plurality of operation commands related to the error-handling process in an auxiliary command queue; and
   sequentially executing the operation commands in the auxiliary command queue and stopping the execution of the major command queue.

7. The error-handling method of claim 6, wherein when the operation is a write operation, the error is a write fail, and when the write fail occurs during the write operation, the write operation is performed again according to the operation commands in the auxiliary command queue.

8. The error-handling method of claim 6, wherein when the operation is an erase operation, the error is an erase fail, and when the erase fail occurs during the erase operation, the erase operation is performed again according to the operation command in the auxiliary command queue.

9. The error-handling method of claim 6, wherein when the operation is a read operation, the error is an error correction code (ECC) fail, and when the ECC fail occurs during the read operation, the read operation is performed again according to the operation commands in the auxiliary command queue.

10. The error-handling method of claim 6, further comprising:
   when the operation commands in the auxiliary command queue are finished, continuing to execute the operation commands in the major queue.

* * * * *